United States Patent [19]
Whitehead

[11] Patent Number: 6,025,583
[45] Date of Patent: Feb. 15, 2000

[54] CONCENTRATING HELIOSTAT FOR SOLAR LIGHTING APPLICATIONS

[75] Inventor: Lorne A. Whitehead, Vancouver, Canada

[73] Assignee: The University of British Columbia, Vancouver, Canada

[21] Appl. No.: 09/074,701

[22] Filed: May 8, 1998

[51] Int. Cl.[7] .................................................. G01C 21/02
[52] U.S. Cl. ......................... 250/203.4; 126/578; 359/853
[58] Field of Search ............... 250/203.4; 126/573–578, 126/600; 359/742, 852, 853

[56] References Cited

U.S. PATENT DOCUMENTS

| | | | |
|---|---|---|---|
| 4,365,618 | 12/1982 | Jones | 126/576 |
| 4,511,618 | 4/1985 | Duchene et al. | 359/883 |
| 4,519,382 | 5/1985 | Gerwin | 250/203.4 |
| 5,862,799 | 1/1999 | Yogev et al. | 126/578 |

*Primary Examiner*—Stephone Allen
*Attorney, Agent, or Firm*—Oyen Wiggs Green & Mutala

[57] ABSTRACT

An optical system for variably re-directing light (preferably sunlight) which passes through an input aperture. The input aperture is covered with a flexible optical film such as a Fresnel lens having an optical deflection characteristic which varies as a function of position so as to redirect the light in a direction which varies as a function of such position. The film is supported with a selected portion of the film covering the input aperture, and with the non-selected portion of the film stored away from the input aperture. A control mechanism controllably displaces the film in the aforementioned direction, to position the selected film portion relative to the input aperture. The film re-directs and concentrates the light into an output aperture whose cross-sectional area is less than the cross-sectional area of the input aperture. The output aperture may be a light guide's input port. At any particular point on the selected film portion, the film's deflection characteristic is approximately proportional to the distance, in the aforementioned direction, between the center of the film and the point. The proportionality is further characterized by a constant having a selected sign and a selected magnitude, whereby substantially all of the light is focused onto the output aperture. The system preferably redirects the light in a direction which is substantially perpendicular to the film.

14 Claims, 8 Drawing Sheets

6,025,583

CONCENTRATING HELIOSTAT FOR SOLAR LIGHTING APPLICATIONS

TECHNICAL FIELD

This application pertains to an inexpensive heliostat for concentrating sunlight into a light guide for use in illuminating the interior of a building in daylight conditions.

BACKGROUND

For some time it has been recognized that it would be desirable to concentrate sunlight into the input end of a light guide, in order to provide solar daylighting deep within the core region of a building. It has been economically unfeasible to implement this concept because, in order to concentrate sunlight to the required extent, it is necessary to counteract the changing direction of the sunlight caused by the sun's apparent motion through the sky. This requires a device known as a "heliostat". Prior art heliostats have been too expensive to justify their use in solar daylighting applications. The present invention provides a novel, inexpensive concentrating heliostat which can be used to implement solar daylighting in an economically feasible manner.

SUMMARY OF INVENTION

The invention provides an optical system for variably re-directing light (preferably sunlight) which passes through an input aperture. The input aperture is covered with a flexible optical film such as a Fresnel lens having an optical deflection characteristic which varies as a function of position so as to redirect the light in a direction which varies as a function of such position. The film is supported with a selected portion of the film covering the input aperture, and with the non-selected portion of the film stored away from the input aperture. A control mechanism controllably displaces the film in the aforementioned direction, to position the selected film portion relative to the input aperture. The film re-directs and concentrates the light into an output aperture whose cross-sectional area is less than the cross-sectional area of the input aperture. The output aperture may be a light guide's input port.

At any particular point on the selected film portion, the film's deflection characteristic is approximately proportional to the distance, in the aforementioned direction, between the center of the film and the point. The proportionality is further characterized by a constant having a selected sign and a selected magnitude, whereby substantially all of the light is focused onto the output aperture.

The system preferably redirects the light in a direction which is substantially perpendicular to the film.

Advantageously, first and second perpendicularly oriented flexible optical films may be used. Like, the first film, the second film also has an optical deflection characteristic which varies as a function of position so as to redirect light in a direction which varies as a function of such position. The second film is supported with a selected portion of the second film covering the input aperture, and with the non-selected portion of the second film stored away from the input aperture. A second control mechanism controllably displaces the second film to position the selected portion of the second film relative to the input aperture.

The control mechanism incorporates first and second detectors mounted centrally with respect to the input aperture. The detectors are oriented to detect light which is emitted through the optical film in a preferred direction (i.e. substantially perpendicular to the film). The detectors respectively produce first and second output signals representative of error between the preferred direction and the direction in which light emitted through the optical film is actually incident upon the respective detectors. The error signal can then be used to controllably reposition the selected film portion(s) so as to reduce the error in direction.

The support mechanism incorporates first and second rollers. The flexible optical film is mounted on the rollers so that it may be wound onto one of the rollers and simultaneously unwound from the other roller, or vice versa. A first drive mechanism is coupled between the control means and the first roller; and, a second drive mechanism is coupled between the control means and the second roller. An error signal like that mentioned above can be applied to the respective drive mechanisms to rotate the respective rollers and thereby reduce error in the light's preferred direction by repositioning the optical film with respect to the input aperture.

BRIEF DESCRIPTION OF DRAWINGS

FIGS. 3A, 3B and 3C each include a central, circled portion depicting the operative portion of the Fresnel lens structure on an enlarged scale.

DESCRIPTION

Figure 1:
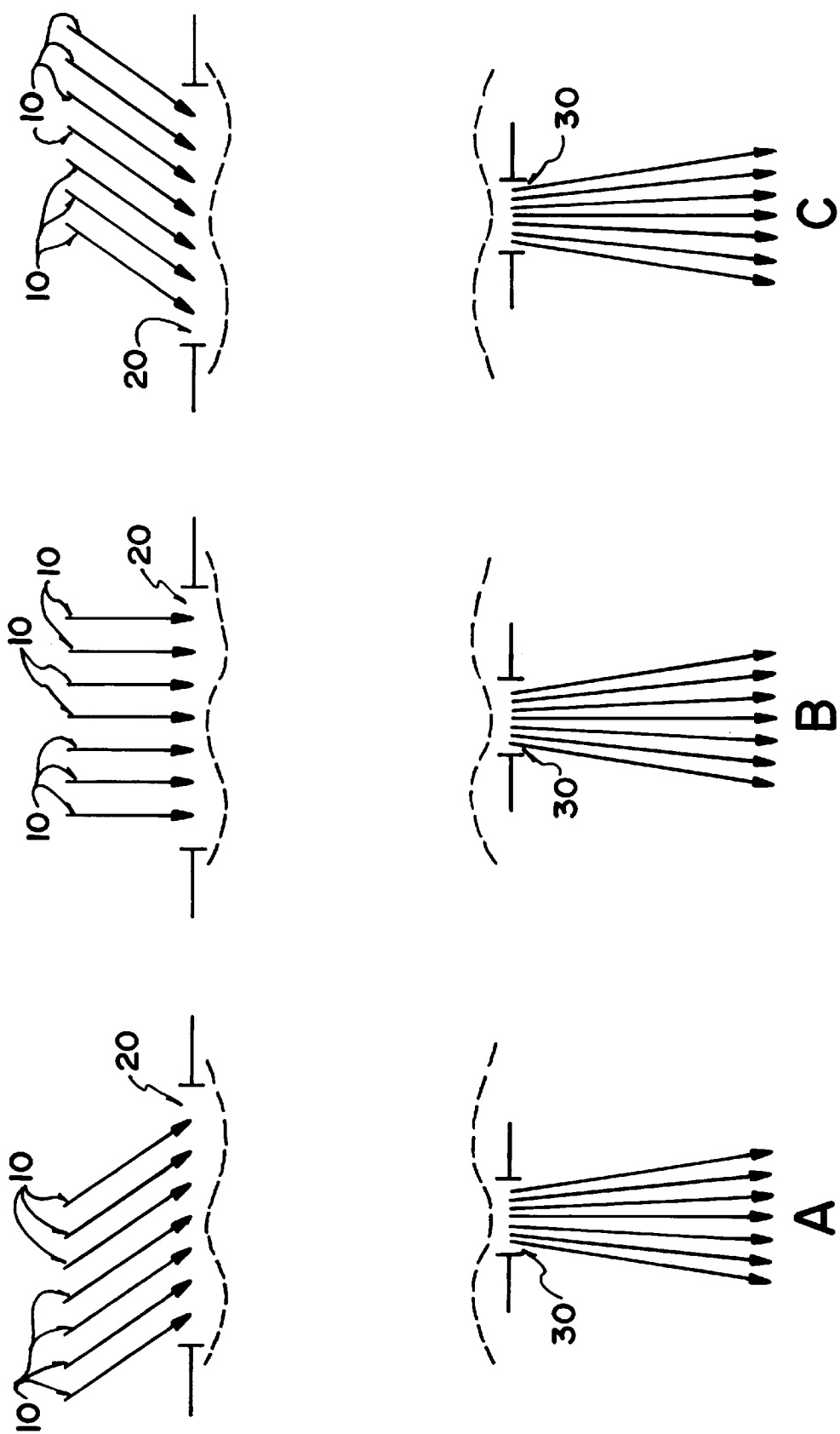
FIG. 1A schematically depicts the ideal operation of a prior art solar light concentration system having an input aperture upon which sunlight is incident, and an output aperture from which concentrated sunlight is emitted in a preferred direction.
FIGS. 1B and 1C are identical to FIG. 1A, except that the sunlight is incident upon the input aperture in different directions representative of the sun's change in position at different times of the day.

FIGS. 1A, 1B and 1C illustrate the optical problem encountered in using a heliostat to concentrate sunlight.

Sunlight rays 10 are incident upon input aperture 20. For simplification, the heliostat and light concentrator are not shown in FIGS. 1A–1C, but are represented by dashed wavy lines. Ideally, the heliostat and light concentrator deliver concentrated sunlight through output aperture 30.

Since the earth rotates, sunlight rays 10 are incident upon the heliostat at different directions at different times of the day, as indicated in FIGS. 1A–1C respectively. The heliostat compensates for the continuously changing direction of the incident sunlight by redirecting the light rays incident upon input aperture 20 such that they can subsequently be concentrated by the light concentrator such that a substantial fraction of the light energy is emitted through output aperture 30 in a preferred direction which remains substantially the same irrespective of changes in the direction of the incident sunlight. Because the cross-sectional area of output aperture 30 is smaller than that of input aperture 20, the sunlight is concentrated. The emitted light rays need not necessarily be substantially parallel. Generally however there will be a maximum acceptable limit to the divergence of emitted light, such limit depending on the intended use of the emitted light.

Figure 2:
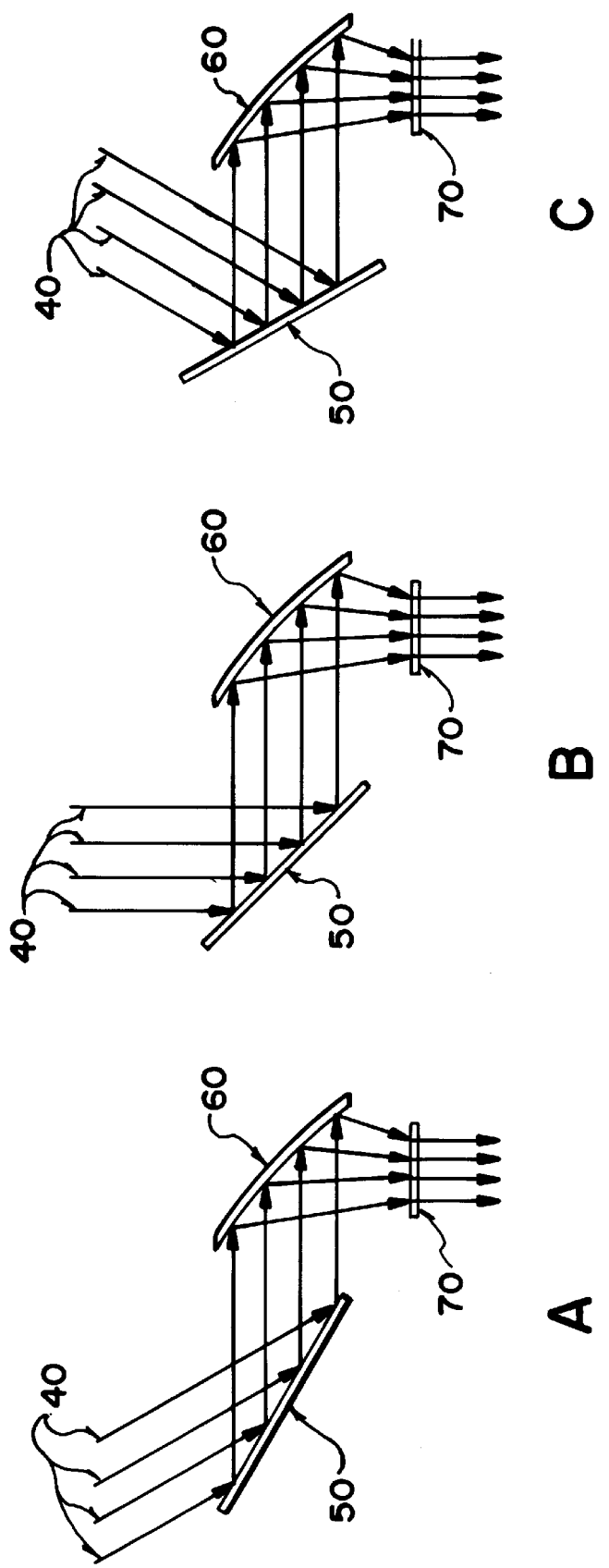
FIG. 2A schematically depicts a prior art heliostat configured to operate as depicted in FIG. 1A.
FIGS. 2B and 2C are identical to FIG. 2A, except that they show the heliostat configured to operate as depicted in FIGS. 1B and 1C respectively.

A variety of optical structures can be used to redirect sunlight as schematically illustrated in FIGS. 1A–1C. FIGS. 2A–2C show one such prior art structure. Sunlight rays 40 are incident upon plane mirror heliostat 50 which reflects the light rays onto off-axis paraboloidal converging mirror 60 which in turn reflects the light rays onto confocal diverging lens 70 through which the light rays are emitted substantially parallel and concentrated relative to their original input intensity. Heliostat 50 is oriented, in known fashion, by an appropriate control mechanism (not shown) to compensate for changes in direction of incident rays 40 such that the rays are always reflected from heliostat 50 onto converging mirror 60 and thence through diverging lens 70 as aforesaid. Prior art systems incorporating such control mechanisms (or lo their analogues in functionally equivalent prior art systems) have been bulky and complex from both mechanical and optical perspectives. This has rendered such systems prohibitively expensive for use in solar daylighting applications.

Figure 3:
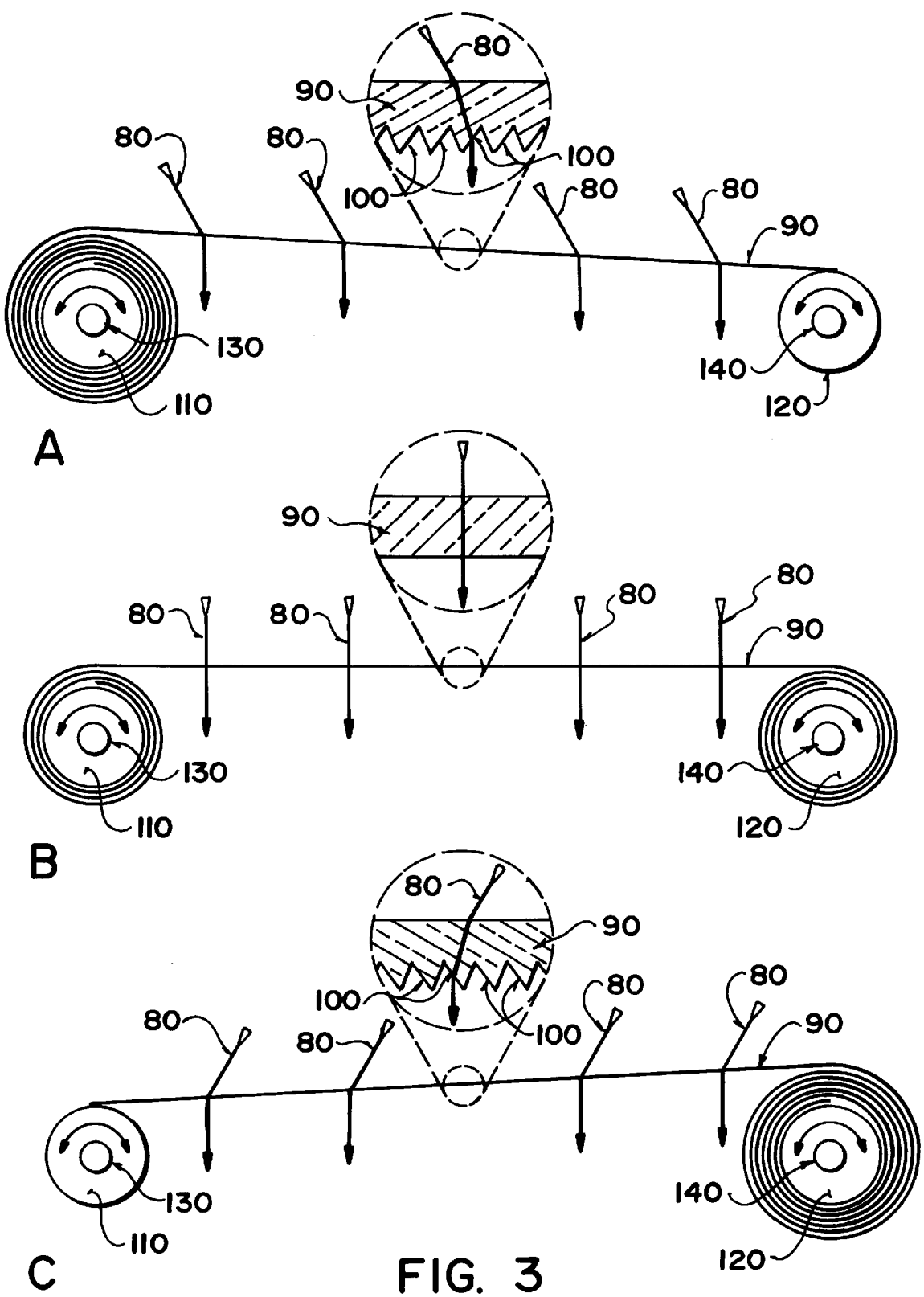
FIG. 3A depicts a Fresnel lens structure configured in accordance with the present invention.
FIGS. 3B and 3C are identical to FIG. 3A, except that they show the Fresnel lens structure configured to operate with sunlight which is incident upon the structure in different directions representative of the sun's change in position at different times of the day.

FIGS. 3A–3C depict a preferred embodiment of a Fresnel lens structure in accordance with the present invention. Incident sunlight rays 80 pass through an input aperture which is covered by a flexible Fresnel lens material 90 mounted on and extending between spaced apart rollers 110, 120. Consider first the situation depicted in FIG. 3A, in which sunlight rays 80 are incident upon Fresnel lens material 90 in a left-right angular direction and in which most of Fresnel lens material 90 remains unused and wound upon roller 110. One end of Fresnel lens material 90 is fixed to roller 120, but no portion of Fresnel lens material 90 is wound upon roller 120 as depicted in FIG. 3A. As seen in the encircled, enlarged portion of FIG. 3A, the selected "in use" portion of Fresnel lens material 90 extending between rollers 110, 120 is a prismatic film bearing a plurality of prisms 100 which face away from the origin of incident light rays 80. Prisms 100 refract incident light rays 80 and redirect them in a preferred substantially perpendicularly downward direction relative to Fresnel lens material 90.

Rollers 110, 120 are respectively controlled by drive mechanisms 130, 140 such that Fresnel lens material 90 can be unwound from roller 110 onto roller 120 or vice versa in order to cover the input aperture with different selected sections of Fresnel lens material 90. Thus, as shown in FIG. 3B, drive mechanisms 130, 140 can be actuated to unwind a portion of Fresnel lens material 90 from roller 110 and to wind an equivalent length portion of Fresnel lens material 90 onto roller 120. As seen in the encircled, enlarged portion of FIG. 3B, the selected "in use" Fresnel lens material 90 extending between rollers 110, 120 bears no prisms. Accordingly, sunlight rays 80, which in the situation depicted in FIG. 3B are incident upon Fresnel lens material 90 in the perpendicular direction, pass through Fresnel lens material 90 with no change in direction and thus when emitted through Fresnel lens material 90, have the same preferred downwardly direction relative to Fresnel lens material 90 as the redirected light rays shown in FIG. 3A.

Now consider the situation depicted in FIG. 3C, in which sunlight rays 80 are incident upon Fresnel lens material 90 in a right-left angular direction and in which most of Fresnel lens material 90 remains unused and wound upon roller 120. One end of Fresnel lens material 90 is fixed to roller 110, but no portion of Fresnel lens material 90 is wound upon roller 110 as depicted in FIG. 3C. As seen in the encircled, enlarged portion of FIG. 3C, the selected "in use" Fresnel lens material 90 extending between rollers 110, 120 again bears a plurality of prisms 100 which refract incident light rays 80 and redirect them in the preferred downwardly direction relative to Fresnel lens material 90.

It can thus be seen that the apparatus depicted in FIGS. 3A–3C has the ability to redirect sunlight which is incident upon the apparatus in various directions and to redirect the light into a preferred direction. Note that the apparatus of FIGS. 3A–3C does not, by itself, concentrate the sunlight, but simply redirects the light with a fixed directionality. Accordingly, in the desired solar daylighting application, some optical concentration mechanism such as another Fresnel lens is apparently required. This is a relatively minor problem since such concentration mechanisms are readily available, although their use would introduce an additional cost factor and an attendant loss in optical efficiency. A more significant problem is that the apparatus of FIGS. 3A–3C requires a very large amount of Fresnel lens material, because sufficient material must be provided to cover the full width of the input aperture with a selected segment of Fresnel lens material having an optical deflection characteristic corresponding to each one of large number of incident sunlight directions. Fortunately, both of these problems can be solved simultaneously by careful design of the spatial variation of the optical characteristics of the Fresnel lens. Before describing this concept, it is first convenient to refer to FIG. 4 and review the operation of a conventional Fresnel lens.

Figure 4:
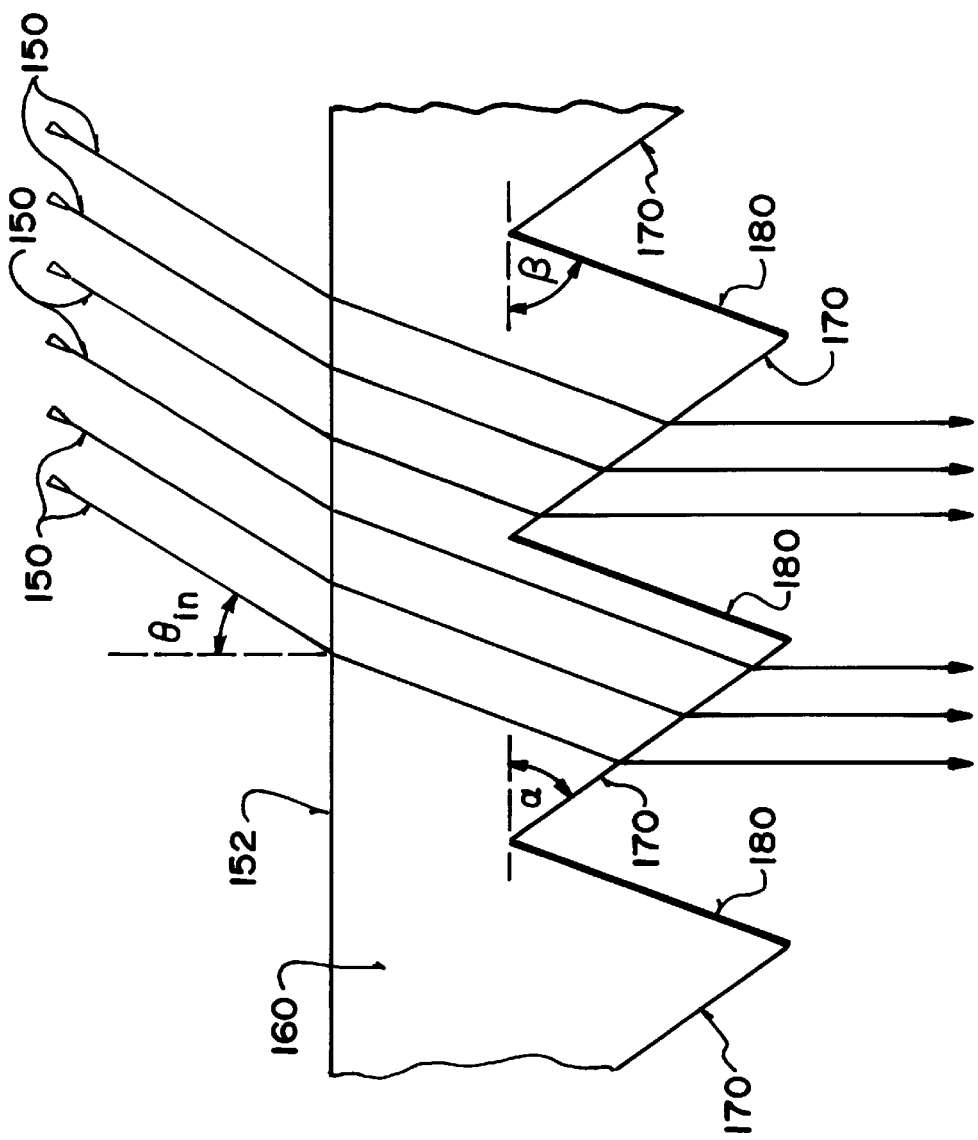
FIG. 4 is an enlarged, cross-sectional illustration of a portion of a prior art prismatic film Fresnel lens, and illustrates operation thereof.

As seen in FIG. 4, incident light rays 150 are inclined at an angle $\theta_{in}$ relative to an axis perpendicular to the flat upper surface 152 of prismatic film Fresnel lens material 160. Incident rays 150 are refracted by Fresnel lens material 160, in accordance with Snell's law. The prisms incorporated in Fresnel lens material 160 are characterized by angles $\alpha$ and $\beta$, as shown. The angle $\alpha$ characterizes the angle of tilt of the "active" Fresnel lens surfaces 170 through which the refracted rays are emitted; and, the angle $\beta$ characterizes the angle of tilt of the ideally inactive Fresnel lens surfaces 180. That is, angle $\beta$ is selected so as to minimize the intersection of light rays with Fresnel lens surfaces 180, such that most rays are refracted by surfaces 170. Such a Fresnel lens design is just one of many possible lens designs. The present invention is not restricted to use with the FIG. 4 Fresnel lens structure. In fact the present invention is not limited to the use of Fresnel lens optical films. Diffractive optics films could also be used, as could hybrid films employing refraction, diffraction, and/or reflection, in various combinations. All that is required is that the film have the desired optical deflection characteristics described herein.

Figure 5:
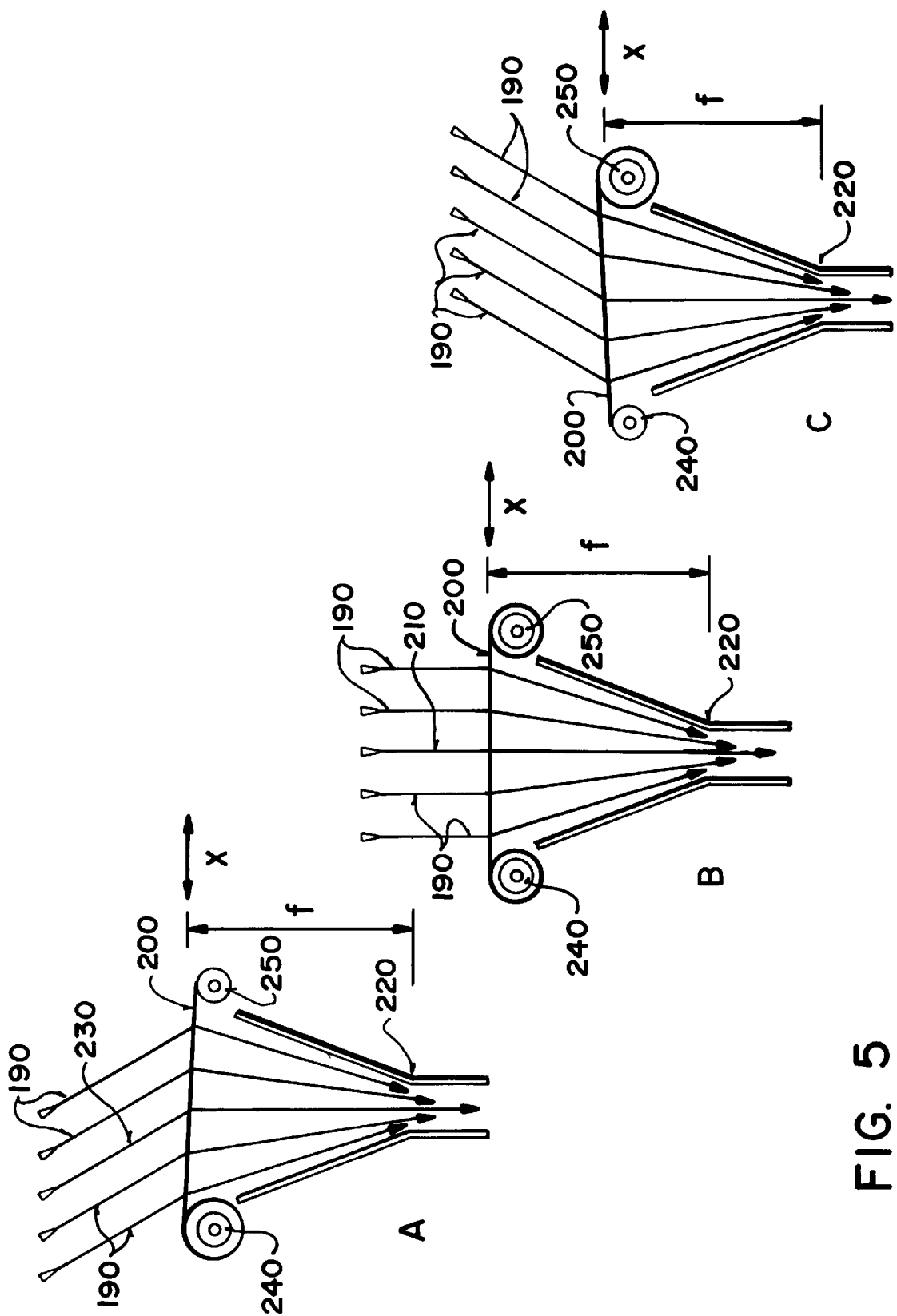
FIG. 5A depicts a Fresnel lens structure positioned in the same manner as that of FIGS. 3A–3C, but with a different spatial variation of optical deflection, such that the lens concentrates incident sunlight and emits same in a preferred direction into a light guide.
FIGS. 5B and 5C are identical to FIG. 5A, except that they show the Fresnel lens structure configured to operate with sunlight which is incident upon the structure in different directions representative of the sun's change in position at different times of the day.

FIGS. 5A–5C show how the problems noted above with respect to the apparatus of FIGS. 3A–3C can be solved. FIG. 5A is similar to FIG. 3A in that FIG. 5A shows incident sunlight rays 190 passing through an input aperture covered by a flexible Fresnel lens material 200 mounted on and extending between spaced apart rollers 240, 250. However, the FIG. 5A embodiment requires much less Fresnel lens material than the FIG. 3A embodiment because, in the FIG. 5A embodiment, the optical characteristic of Fresnel lens material 200 varies continuously as a function of position x along the Fresnel lens in the direction indicated by the double-headed arrow. Consequently, the optical effect of Fresnel lens material 200 upon the incident light rays varies continuously across the input aperture, regardless of how the lens is positioned. Depending upon the particular portion of material 200 which is exposed to extend between rollers 240, 250 as determined by actuation of the associated roller control mechanisms, the deflection characteristics of the central region of the lens will vary and can be selected according to the direction of the incident light rays. This design requires much less lens material because there is no need for a substantial expanse of lens to uniformly exhibit a selected deflection characteristic. Further, as will be shown below, a useful by-product of this design is that the re-directed sunlight is also concentrated.

Consider for example the situation shown in FIG. 5B. Central sunlight ray 210 is incident upon the exposed portion of Fresnel lens material 200 extending between rollers 240, 250 in the perpendicular direction at the point ray 210 intersects the centre of Fresnel lens material 200 (i.e. at position x=0). At this point, Fresnel lens material 200 has no optical effect (i.e. bears no prisms, as discussed above with reference to FIG. 3B) such that ray 210 is not redirected and is emitted in a preferred downward direction through output aperture 220 (which may be the input port of a light guide). Incident sunlight rays striking other parts of the exposed portion of Fresnel lens material 200 extending between rollers 240, 250 are redirected. The magnitude of such redirection is approximately proportional to the distance in position x between the point at which the incident ray strikes the exposed portion of Fresnel lens material 200 and the centre of the input aperture. The net result of this variation of lens characteristic is that the redirected light rays converge substantially toward a focal region which lies a distance $f$ below the centre of the input aperture. Those skilled in the art will recognize that this optical characteristic is substantially that of a converging lens having a focal length $f$. For small angles of redirection, this is precisely the case, and is approximately the case for larger angles of redirection.

Consider now the situation depicted in FIG. 5A in which the central incident sunlight ray 230 (and all of the parallel incident rays) travel downwardly from left to right. Most of Fresnel lens material 200 has been wound onto roller 240, such that ray 230 encounters a portion of the exposed Fresnel lens material capable of deflecting ray 230 in the preferred downwardly direction. Because the optical characteristic of Fresnel lens material 200 continuously varies as a function of position x, only central ray 230 is redirected in the preferred perpendicularly downward direction. The other incident sunlight rays parallel to ray 230 are redirected by Fresnel lens material 200, but not in the preferred perpendicularly downward direction. Rather, such other rays are redirected in a direction differing from the perpendicular downward direction by an amount which is approximately proportional to the distance in position x between the point at which such other rays strike the exposed portion of Fresnel lens material 200 and the centre of the input aperture. Note that again such redirection yields the desired focusing effect. All that is required is that the rate of change of the optical deflection characteristic of Fresnel lens material 200 as a function of position be such that the resultant focusing effect causes the redirected light rays to converge at the desired distance $f$, as hereinafter discussed in greater detail.

FIG. 5C depicts yet another case in which the incident light rays 190 travel downwardly from right to left. Most of Fresnel lens material 200 has been wound onto roller 250 to expose between rollers 240, 250 that portion of Fresnel lens material 200 having an optical deflection characteristic capable of redirecting the incident light rays with the desired focusing effect at distance $f$ from the aperture. The required winding and unwinding of Fresnel lens material 200 is achieved by drive mechanisms associated with rollers 240, 250 which are in turn controlled in an appropriate manner to achieve the desired optical effect as shown.

The optical effects described above with respect to FIGS. 3A–3C, FIG. 4 and FIGS. 5A–5C are in reference to the motion of light rays within a specific cross-sectional plane. As such, the Fresnel lens material shown in FIGS. 3A–3C, FIG. 4 and FIGS. 5A–5C should be construed to be linear Fresnel lens material having prisms whose longitudinal axes extend perpendicular to the cross-sectional plane in question. Such prisms have essentially no optical effect relative to the direction of propagation of light rays in the direction perpendicular to such cross-sectional plane. However, in most cases it is necessary to deal with light rays which also have a component of angular variation in such perpendicular direction. One simple approach for handling this would be to use two systems as shown in FIGS. 5A–5C, mounted at right angles to one another. One such system could respond to angular motion of the sun in one direction and concentrate the sunlight in that direction; and, the second such system could operate at right angles to the first system in order to deal with the other direction of variation of the sunlight and to correspondingly concentrate in that direction. However, an objective of the present invention is to provide a low cost mechanism for concentrating sunlight. It is accordingly desirable to avoid the expense involved in providing two systems as aforesaid.

Figure 6:
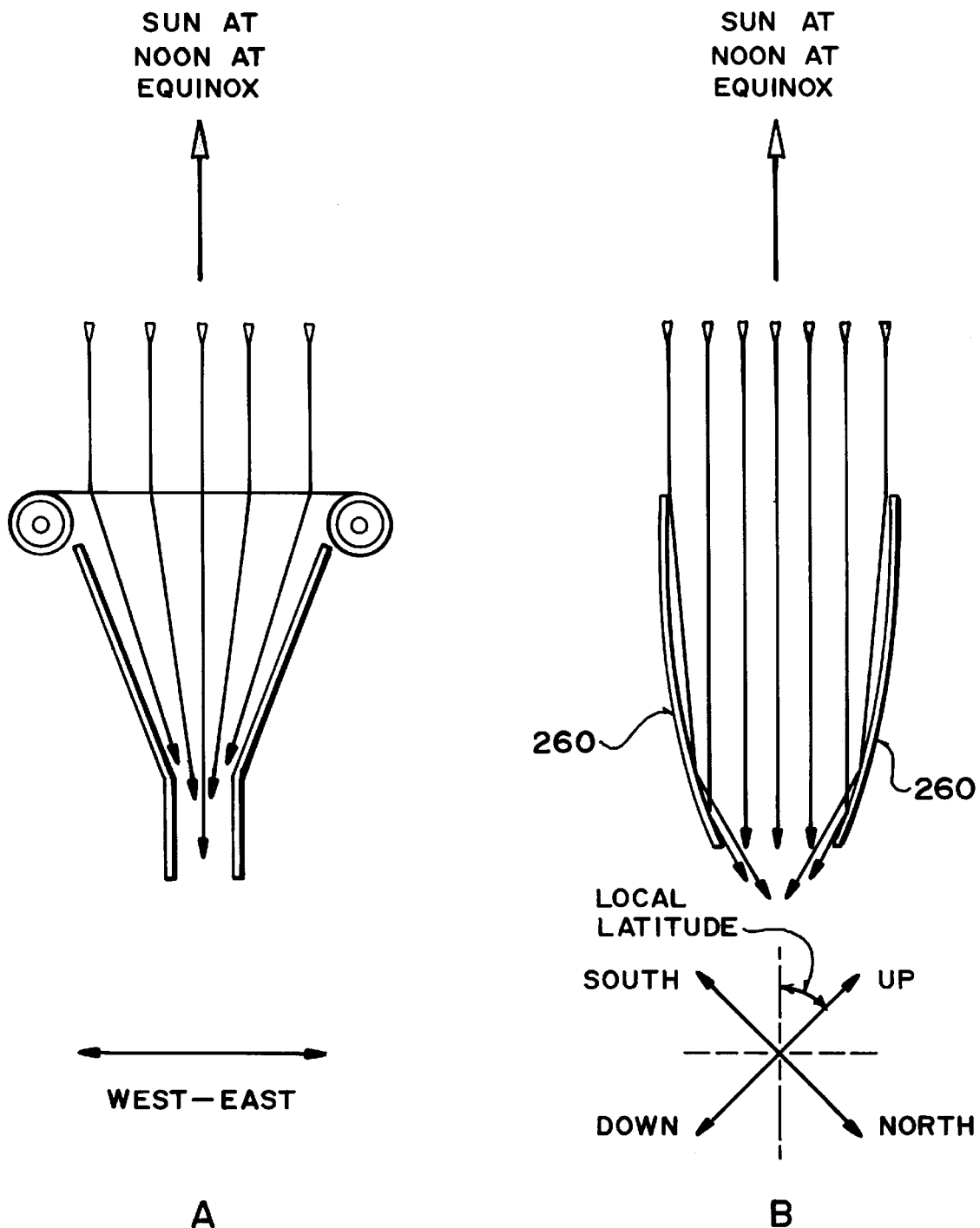
FIGS. 6A and 6B together depict a preferred orientation of the apparatus of FIGS. 5A–5C in respectively perpendicular cross-sectional planes.

A less expensive solution is to use the optical arrangement depicted in FIGS. 6A and 6B. This arrangement exploits the fact that the sun undergoes large angular variation in the sky in one direction, and relatively small angular variation in the perpendicular direction. FIG. 6A is a cross-sectional illustration showing a plane extending east-west and inclined away from the vertical such that it points toward the sun's location at noon on the equinox, which is well known to be an angle above the horizon equal to 90° minus the local latitude. The sun's motion within this plane is very large, and the optical system depicted in FIG. 6A is designed to accommodate a reasonably large amount of such variation (typically up to about +45°, representing about six hours of the sun's motion centred on noon). The cross-sectional plane of FIG. 6B is at right angles to that of FIG. 6A, with the top of the page again representing the direction toward the equinox solar noon, as shown. Thus, the cross-sectional plane of FIG. 6B is vertical and the directions up, down and north, south are as shown. In the cross sectional plane of FIG. 6B the sun undergoes much less angular variation. During the central six hours of the day the angular variation within this plane is typically about +25° primarily due to the seasonal variation of the motion of the sun in the sky. With this smaller amount of angular variation, it is more practical to use a passive concentrator such as that shown, namely a compound parabolic concentrator consisting of a pair of off-axis parabolic reflectors 260. Alternatively, passive concentrator designs could also be used, employing alternate passive elements such as Fresnel lenses. The significant point is that the smaller angular variation in the FIG. 6B plane can be compensated for by a less expensive, lower quality concentration of sunlight in this direction.

Figure 7:
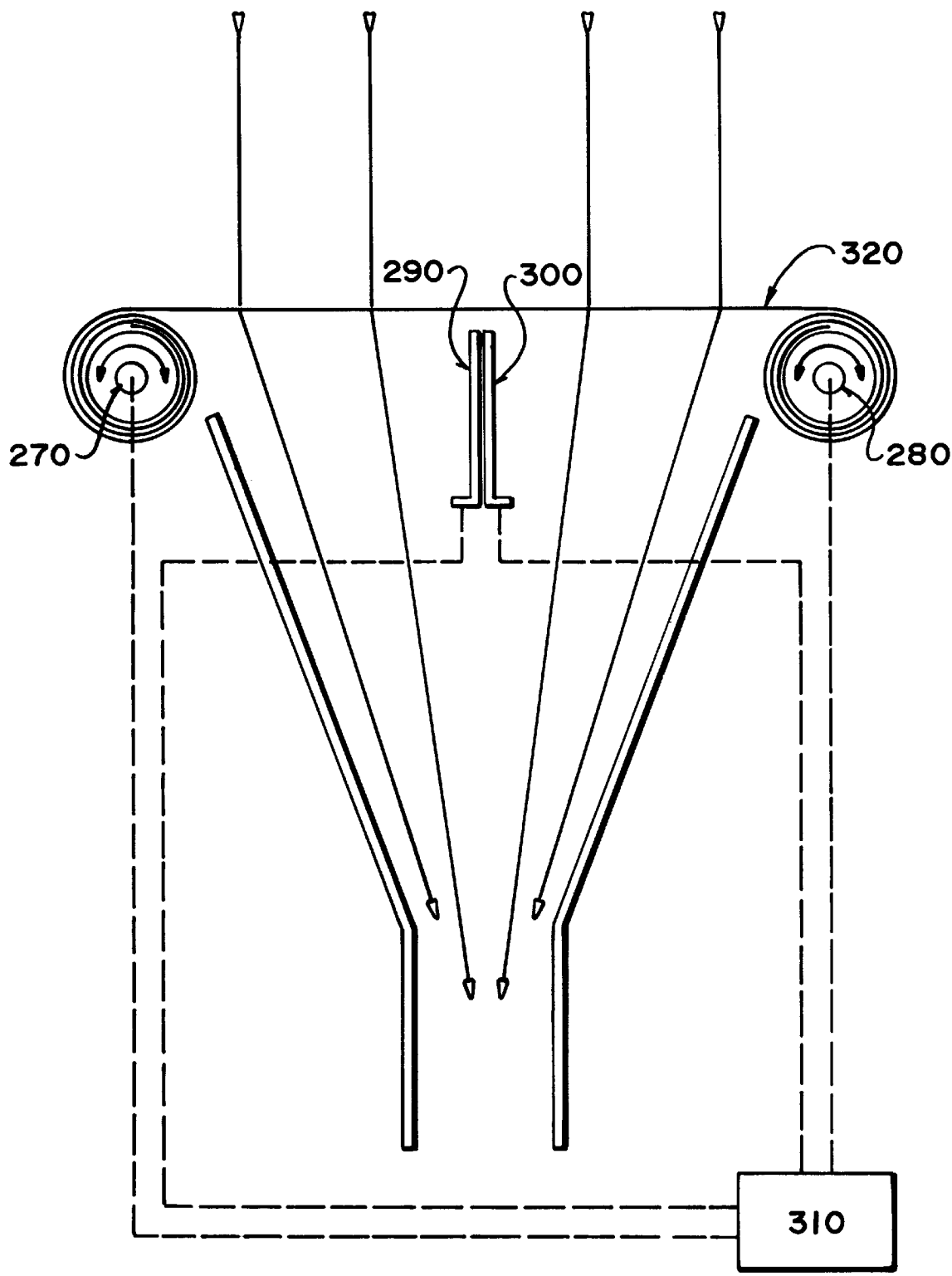
FIG. 7 depicts a solar-powered feedback mechanism for controllably adjusting the Fresnel lens structure of FIGS. 5A–5C in response to changes in direction of the sunlight incident upon the structure.

FIG. 7 depicts a mechanism for controlling winding and unwinding of Fresnel lens material 320 on rollers 270, 280. Photo-sensitive detectors 290, 300 are placed back-to-back and centrally located within the input aperture covered by the exposed portion of Fresnel lens material 320 extending between spaced-apart rollers 270, 280. Detectors 290, 300 produce electrical output signals representative of the intensity of the light incident upon the respective detectors. The output signals are input to controller 310. If Fresnel lens material 320 is displaced in the "wrong" position, then light rays emitted through the central portion of the exposed Fresnel lens material 320 toward detectors 290, 300 will not travel in the preferred downward direction as previously described, but will travel to the left if the displacement error is in one direction, or to the right, if the displacement error is in the opposite direction. By comparing the difference in the light intensity output signals produced by detectors 290, 300 controller 310 can determine the direction of the displacement error and produce appropriate error correction signals for feedback to rollers 270, 280 causing them to rotate as required to expose a different section of Fresnel lens material 320 and thereby reduce the error. This simple feedback system can maintain proper alignment of Fresnel lens material 320 at all times (i.e. irrespective of the direction of the incident sunlight rays). If detectors 290 and 300 are photovoltaic cells which each transmit current in opposite directions to a DC motor coupled to the respective drive rollers 270, 280 then controller 310 is not even required.

Figure 8:
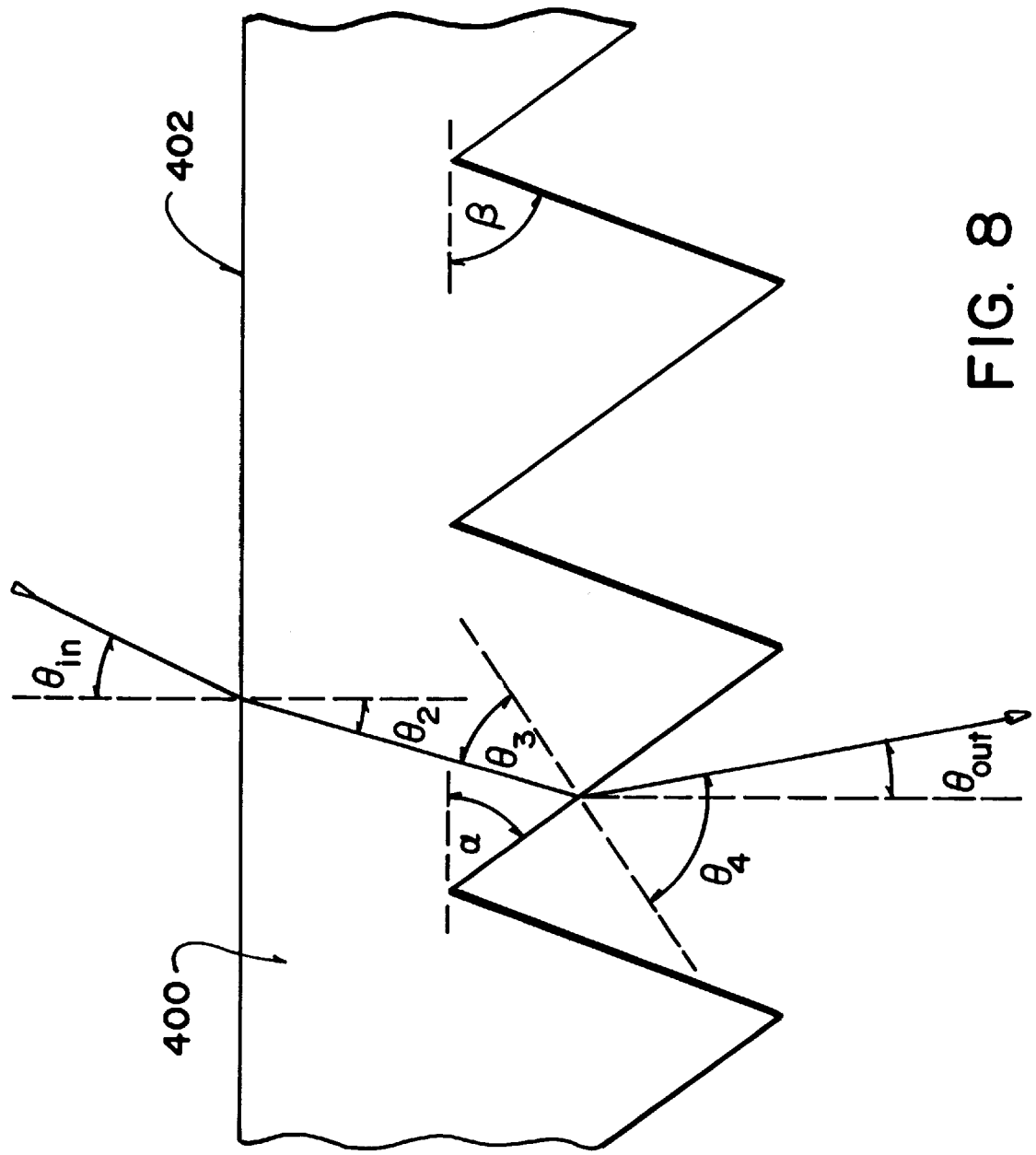
FIG. 8 is an enlarged, cross-sectional illustration of a portion of a prismatic film Fresnel lens illustrating operation thereof in accordance with the invention.

FIG. 8 again depicts a Fresnel lens structure as one example structure for the optical film used in this invention. $\theta_{in}$ represents the extent to which the input light deviates from the direction perpendicular to the flat input surface 402, and $\theta_{out}$ similarly represents the extent to which the output light deviates from the perpendicular direction to surface 402. With these angles defined as shown in FIG. 8, $\theta_{out}$ would be equal to $\theta_{in}$ if there were no optical deflection of the light, as would be the case in this example if the prism angle $\alpha$ were 0. In this particular example, $\theta_{out}$ can be calculated for any given value of $\theta_{in}$, $\alpha$, and n, (the refractive index of the material 400 comprising the lens). This is done by first using Snell's Law to determine $\theta_2$, then using this angle to determine $\theta_3$, then using Snell's Law again to determine $\theta_4$, and finally using this angle to determine $\theta_{out}$. This is a rather tedious calculation, which can be considerably simplified by employing the small angle approximation: $\sin(\theta)=\theta$ which is a good approximation providing that $\theta_{in}$ and o are not too large. In this case the calculation above leads to the very simple result that:

$$\theta_{out}=(n-1)\alpha-\theta_{in} \quad (1)$$

As already mentioned, the lens system of FIG. 8, and the small angle approximation leading to equation (1), are not fundamental to this invention. In general, all that matters is that the optical film at any position be characterized by some optical parameter $\alpha$ which is a measure of the extent to which the film deflects light rays. Generally, then, we expect that:

$$\theta_{out}=g(\alpha,\theta_{in}) \quad (2)$$

where g is some function, such as for example that shown in equation (1).

It is helpful to consider also another function, which gives the required value of $\theta_{in}$ to produce a specified output angle $\theta_{out}$:

$$\theta_{in}=h(\alpha,\theta_{out}) \quad (3)$$

We would like now to determine how the deflection parameter $\alpha$ should vary as a function of position x on the lens, in order to yield the desired focusing of light rays into a small region located a distanced $f$ below the lens, as depicted in FIGS. 5A, 5B and 5C.

To do this it is helpful to define an angle $\theta^*(x)$ which, at any position x on the lens, is the input angle which produces an output angle $\theta_{out}=0$. According to (2), we have that:

$$\theta^*(x)=h(\alpha(x),0) \quad (4)$$

When the system is in use, it will generally be desirable to have the light ray that strikes the center of the aperture deflected such that $\theta_{Out}=0$. Thus, the lens must be positioned such that the point on the lens for which $\theta^*=\theta_{in}$, is located in the center of the aperture. To clarify this, it is helpful to distinguish between positions across the optical film itself and positions across the aperture. Positions on the optical film are measured with the variable x representing the distance from the optical center of the optical film (including the film portions on the rollers, measured longitudinally along the film as though it were unrolled and laid flat). Positions on the aperture will be represented with a variable a representing the distance from the center of the aperture. If we use the variable D to represent the amount of displacement of the optical center of the film from the center of the aperture, then these variables are related by:

$$x=a-D \quad (5)$$

and according to the preceding discussion, for any input solar angle $\theta_{in}$ D will be adjusted until at the center of the aperture (i.e. where $\alpha=0$)

$$\theta^*(x)=\theta^{(-D)}=\theta_{in} \quad (6)$$

The key question is how rapidly the parameter $\alpha(x)$ should vary as a function of x. If $d\alpha(x)/dx$ is too great, the rays will concentrate to a focus prematurely, and conversely, if $d\alpha(x)/dx$ is too small, the rays will concentrate to a focus too slowly. It is well known in optics that under these circumstances, the desired rate of concentration to a focus is achieved by varying $\alpha$ such that $$\frac{d\theta_{out}}{d a}=\frac{-1}{f} \quad (7)$$

where $f$ is the distance to the focus as shown in FIGS. 5A, 5B and 5C.

Since the input light is substantially parallel, we know that $\theta_{in}$ is substantially independent of a and as described earlier this has the value $\theta_*$.

Rearranging equation (7) and using the chain rule, we see that:

$$\frac{-1}{f} = \frac{d\theta_{out}}{da} = \frac{d\theta_{out}}{d\alpha}\frac{d\alpha}{da} = \frac{d\theta_{out}}{d\alpha}\frac{d\alpha}{dx} \qquad (8)$$

Solving equation (8) for dαxdx, we find that $$\frac{d\alpha}{dx} = -\left(f\frac{d\theta_{out}}{d\alpha}\right)^{-1} \qquad (9)$$

Substituting the right hand side of (2) in (9), we obtain $$\frac{d\alpha}{dx} = -\left(f\frac{d}{d\alpha}g(\alpha,\theta^*)\right)^{-1} \qquad (10)$$

To solve this, let us denote the derivative function g', as follows:

$$g'(\alpha,\theta^*) = \frac{d}{d\alpha}g(\alpha,\theta^*) \qquad (11)$$

We can thus rewrite (10) as $$\frac{d\alpha}{dx} = -(fg'(\alpha,\theta^*))^{-1} = -(fg'(\alpha(x), h(\alpha(x),0)))^{-1} \qquad (12)$$

This differential equation can now be solved, (although perhaps only numerically), to yield a solution for α as a function of x.

Such solutions will ideally deviate only moderately from the simple case of the Fresnel lens in the small angle approximation, and so is it is instructive to look at the solution in that case. In that case we have from equation (1) that:

$$g(\alpha,\theta_{in})=(n-1)\alpha-\theta_{in} \qquad (13)$$

and similarly $$h(\alpha,\theta_{out})=(n-1)\alpha-\theta_{out} \qquad (14)$$

In this case, when we evaluate (12), we find the solution $$\alpha(x) = \frac{-1}{(n-1)}\frac{x}{f} \qquad (15)$$

Generally, we expect α to be a function of the dimensionless ratio x/f, and to be approximately proportional to x/f, especially for small values of x/f. Generally, it will be desirable to optimize α(x) to deal with the various aberrations inherent in real optical systems, particularly larger off-axis angles. Such optimization can be performed by computer using well established variational techniques and as such these optimized solutions are construed to lie within the scope of invention claimed here.

Although the invention as described above is primarily intended for directing concentrated sunlight into light guides for daylighting applications, it should also be recognized that the invention may have other important uses. For example, the concentrated sunlight could simply be directed through small skylights at the periphery of a building in order to inject light with less thermal loss than would be encountered with traditional skylights. Similarly, the concentrated sunlight could be directed onto photo-voltaic cells.

Also, since it is well known that light ray paths are substantially reversible in optical systems, this invention could be used to receive divergent light through a small aperture, and to produce a fairly collimated output light beam having a direction determined by the location of the optical film. Such systems, used in these and other applications, are construed to fall within the teachings presented herein.

As will be apparent to those skilled in the art in the light of the foregoing disclosure, many other alterations and modifications are possible in the practice of this invention without departing from the spirit or scope thereof. Accordingly, the scope of the invention is to be construed in accordance with the substance defined by the following claims.

What is claimed is:

1. An optical system for variably re-directing light passing through an input aperture, said system comprising:
   (a) a flexible optical film having an optical deflection characteristic which varies as a function of position in a direction along said optical film to deflect said light by an amount which varies as a function of said position;
   (b) support means for adjustably supporting said optical film with a variably selectable portion of said optical film covering said input aperture and with the remainder of said optical film stored away from said input aperture; and,
   (c) control means for variably selecting said portion of said optical film.

2. An optical system as defined in claim 1, wherein said flexible optical film re-directs and concentrates said light into an output aperture having a cross-sectional area smaller than the cross-sectional area of said input aperture.

3. An optical system as defined in claim 2, wherein:
   (a) for any point on said optical film, said optical deflection characteristic is approximately proportional to the distance, measured along said optical film in said direction, between the center of said optical film and said point; and,
   (b) said proportionality is further characterized by a constant having a selected sign and a selected magnitude, whereby substantially all of said light is focused onto said output aperture.

4. An optical system as defined in claim 3, wherein said light is redirected substantially perpendicular to said optical film.

5. An optical system as defined in claim 2, further comprising:
   (a) a second flexible optical film oriented perpendicular to said optical film, said second optical film having an optical deflection characteristic which varies as a function of a second position in a second direction along said second optical film to redirect said light in a direction which varies as a function of said second position;
   (b) support means for supporting said second optical film with a selected portion of said second optical film covering said input aperture and with a non-selected portion of said second optical film stored away from said input aperture; and,
   (c) control means for controllably displacing said second optical film in said second direction to position said selected portion of said second optical film relative to said input aperture.

6. An optical system as defined in claim 2, further comprising a compound parabolic concentrator oriented perpendicular to said optical film.

7. An optical system as defined in claim 2, wherein said light is sunlight.

8. An optical system as defined in claim 2, wherein said output aperture is a light guide input port.

9. An optical system as defined in claim 2, wherein said control means further comprises first and second detectors mounted centrally with respect to said input aperture, said detectors oriented to detect light emitted through said optical film in a preferred direction, said detectors for producing first and second output signals respectively representative of error between said preferred direction and the direction in which light emitted through said optical film is actually incident upon said respective detectors.

10. An optical system as defined in claim 2, wherein said support means further comprises:
   (a) first and second rollers for winding and unwinding said flexible optical film on and off said respective rollers;
   (b) first drive means coupled to said control means and to said first roller; and,
   (c) second drive means coupled to said control means and to said second roller;
      said control means further comprising a detector for detecting error between a preferred direction and the direction in which light is actually emitted through said optical film, said control means further for producing an output signal representative of said error for application to said respective drive means to rotate said respective rollers and thereby reduce said error by repositioning said optical film with respect to said input aperture.

11. An optical system as defined in claim 2, wherein said support means further comprises:
   (a) first and second rollers for winding and unwinding said flexible optical film on and off said respective rollers;
   (b) first and second DC motors drivingly coupled to said first and second rollers respectively; and,
      wherein said control means further comprises a detector for detecting error between a preferred direction and the direction in which light is actually emitted through said optical film, said control means further for producing first and second equal and opposite current output signals representative of said error for application to said respective DC motors to rotate said respective rollers and thereby reduce said error by repositioning said optical film with respect to said input aperture.

12. An optical system as defined in any one of claims 1–11, wherein said optical film is a Fresnel lens.

13. An optical system as defined in any one of claims 1–11, wherein said optical system further comprises diffractive optics.

14. An optical system as defined in any one of claims 1–11, wherein said light is propagated in a direction from said output aperture toward said input aperture to collimate and controllably deflect an emitted light beam in a variably selectable direction.

* * * * *